Dec. 2, 1924.
G. B. HAINES
1,517,904
TIRE RIM IMPLEMENT
Filed Oct. 8, 1923
2 Sheets-Sheet 1
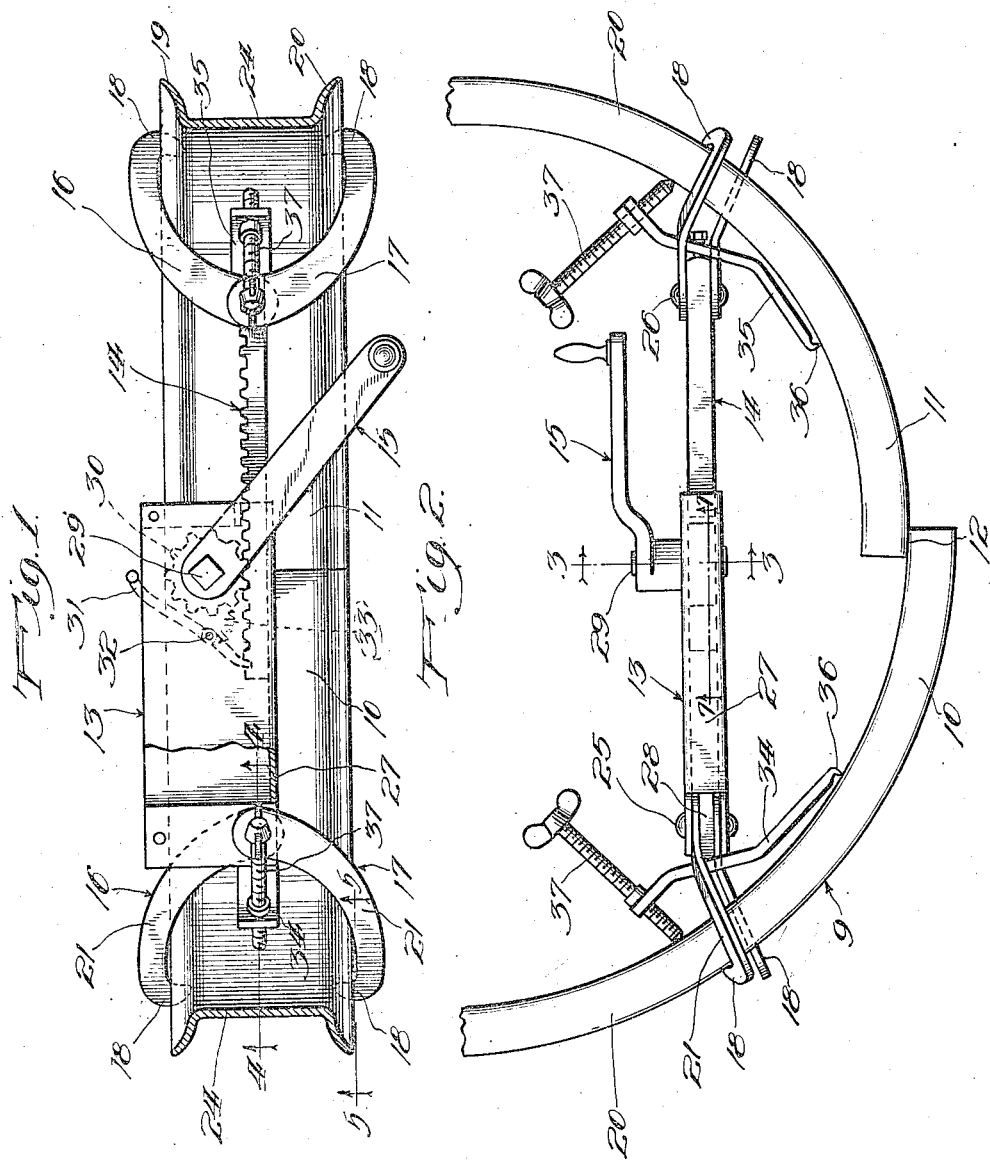
Inventor:
George B. Haines
by Denny & Denny Attys

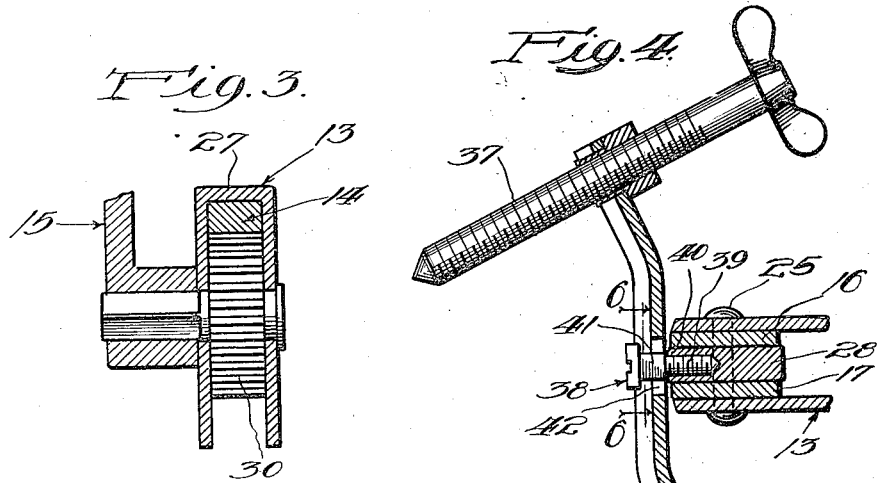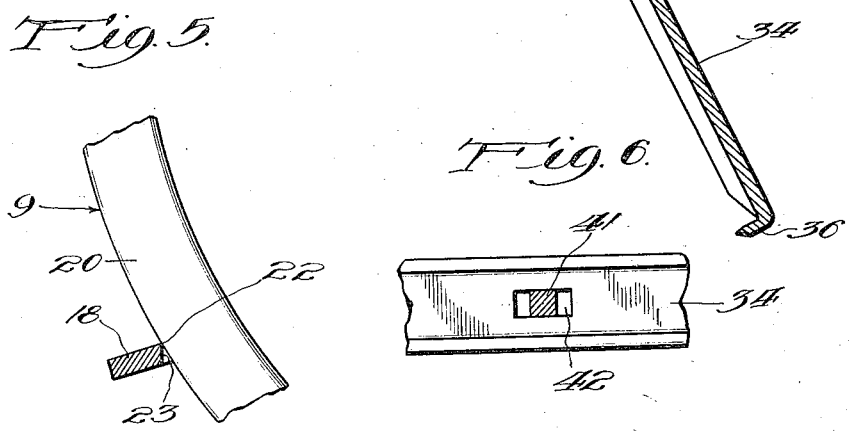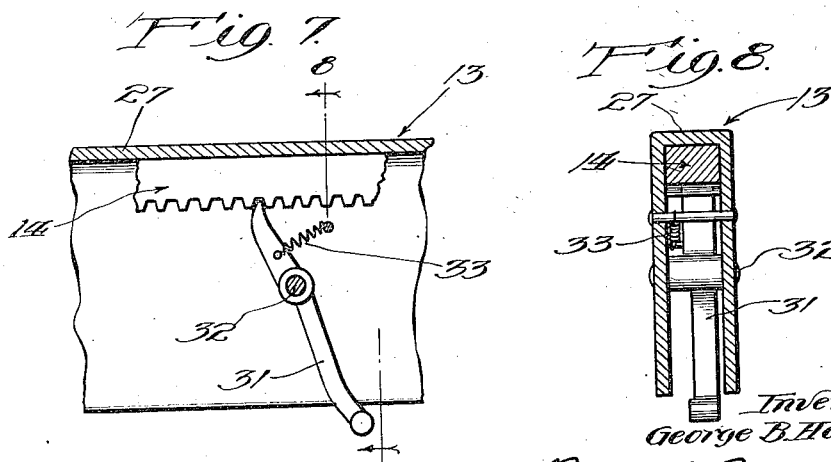

Patented Dec. 2, 1924.

1,517,904

UNITED STATES PATENT OFFICE.

GEORGE B. HAINES, OF CHICAGO, ILLINOIS, ASSIGNOR OF ONE-THIRD TO JAMES M. DEVANEY AND ONE-THIRD TO LEO J. CRAMER, BOTH OF CHICAGO, ILLINOIS.

TIRE-RIM IMPLEMENT.

Application filed October 8, 1923. Serial No. 667,094.

*To all whom it may concern:*

Be it known that I, GEORGE B. HAINES, a citizen of the United States, residing at Chicago, in the county of Cook and State of Illinois, have invented certain new and useful Improvements in Tire-Rim Implements, of which the following is a specification.

This invention has to do with certain improvements in implements for manipulating tire rims and the like. It has to do particularly with an implement for springing split rims, so that the tires can be easily set upon or removed from such rims.

One of the objects of the invention is to provide an arrangement by which the rim can be either contracted or forced apart, as desired, so as to either disengage the rim from the tire or engage it with the tire under pressure, as the case may be.

Another object of the invention is to make it possible to perform these functions by the use of an apparatus in which the operating force is developed by a rotary crank. In connection with the foregoing, a further object is to provide a very simple and rugged construction, and one which can be very cheaply manufactured from a small number of parts.

Another object of the invention is to make provision for a very simple and ready application of the implement to the rim, so that the operations can be very quickly and easily performed. In this connection, a further object is to provide a construction which will give a very firm and substantial connection to the rim when in place thereon. Also to make provision for ready attachment of the device to the rim in a very firm manner without the need of exactly positioning the implement with respect to any given point on the rim.

A further object is to provide an improved construction and arrangement of clamping jaws for gripping the edge portions of the rim so as to insure the proper gripping action to prevent slippage of the implement or its disengagement from the rim without particular regard to the exact angle which the jaws occupy with respect to the rim, so as to facilitate the application and usefulness of the invention.

Other objects and uses of the invention will appear from a detailed description of the same, which consists in the features of construction and combinations of parts hereinafter described and claimed.

In the drawings:

Figure 1 shows a face view of the inner face of the end portions of a split rim having applied thereto an implement embodying the features of the present invention;

Fig. 2 is a view at right angles to that of Fig. 1, the implement having been manipulated to such an extent as to draw the end portions of the rim into overlapping engagement;

Fig. 3 is a section taken on the line 3—3 of Fig. 2, looking in the direction of the arrows, and on enlarged scale;

Fig. 4 is a transverse fragmentary section taken on the line 4—4 of Fig. 1, looking in the direction of the arrows, and on enlarged scale;

Fig. 5 is a fragmentary section taken on the line 5 of Fig. 1, looking in the direction of the arrow, and showing the manner in which the edge portion of the jaw bites the flange of the rim so as to effectively grip the same;

Fig. 6 is a fragmentary section taken on the line 6—6 of Fig. 4, looking in the direction of the arrows;

Fig. 7 is a fragmentary section taken on the line 7—7 of Fig. 2, looking in the direction of the arrows, and showing the locking pawl; and Fig. 8 is a transverse section taken on the line 8—8 of Fig. 7, looking in the direction of the arrows.

Referring first to Figs. 1 and 2, I have therein illustrated my improved implement as being placed upon a tire rim 9 so as to draw the end portions 10 and 11 thereof together. In fact, in Fig. 2, the end portions 10 and 11 are shown as drawn together to such an extent as to cause them to overlap at the point 12.

The implement itself includes a pair of members 13 and 14 which can be shifted with respect to each other under sufficient force by means of a crank or handle 15 to effectively contract or expand the rim itself. Each of the members 13 and 14 carries either directly or indirectly, a pair of jaws 16 and 17. Each of these jaws is pivoted at its inner end and is curved or flared outwardly, as clearly illustrated in Fig. 1; and the outer end of each jaw is provided with an inturned hook 18. These inturned hook portions are adapted to reach over and effectively engage and seize the tire rim flanges 19 and 20 during the gripping operation, and are preferably case hardened.

The jaws 16 and 17 are preferably formed of sheet metal and consequently are preferably relatively thin as compared to their other dimensions. During the operation of contracting the tire rim, the pairs of jaws are drawn towards each other, and the line of effective pull is substantially parallel to the direction of the length of the members 13 and 14, as will be evident from Fig. 2. Inasmuch as the present implement is intended primarily for application to the rim at a point adjacent to the rim ends 10 and 11, it follows that the implement in its ordinary use is intended to be applied to the rim on a short chord as compared to the diameter of the rim. Furthermore, the portions of the rim to which the jaws are applied are slanting towards each other, as is evident from Fig. 2.

In order, therefore, to enable the jaws to grip the rim and its flanges most effectively, I prefer to bend the jaws substantially in the manner indicated in Fig. 2 wherein it will be noted that the body portions 21 of the jaws lie at slight angles with respect to the direction of the rim at the point at which the jaws are applied to the rim. The hook portion 18 of each jaw is caused to bite the edge of the rim flange, as shown at 22 in Fig. 5, on account of the foregoing angularity taken in conjunction with the fact that each of the hook portions 18 may be undercut slightly as shown at 23 in Fig. 5.

The body portions 21 of the jaws will lie against and engage the web 24 of the tire rim and thus establish points of reaction against the clamping action of the hook portions 18.

The pairs of jaws are pivotally mounted upon the pivotal points 25 and 26, as clearly shown in Figs. 1 and 2. These pivotal points are intended to be drawn towards each other with a right line movement when the members 13 and 14 are operated. This allows the jaws to swing and adjust themselves in order to bring about the desired clamping action; and also facilitates the application and removal of the jaws with respect to the rim.

In the particular construction illustrated the members 13 and 14 comprise respectively a U-shaped body member and a rack bar working within the same. The rack bar works against the floor 27 of the U-shaped body member and projects beyond said member. One end of the U-shaped body member receives the inner pivoted ends of the jaws of one pair, and a spacer block 28 is placed between said ends. The pivotal pin 25 passes through the flanges of the U-shaped member, and through the jaws and block 28, so that it holds all of these parts in the proper relative positions. The jaws at the other end of the device are pivotally connected to the rack bar 14 by the pivotal pin 26. A stud 29 passes through the flanges of the U-shaped member 13 and carries a pinion 30 which meshes directly with the rack bar 14. The operating handle 15 can be easily set upon or removed from the projecting end of the shaft 29.

A dog 31 is located between the flanges of the U-shaped member to which it is pivoted by the pin 32. The lower end of this dog is adapted to engage the teeth of the rack bar and for this purpose is drawn down by the spring 33.

The arrangement so far described is such that the jaws will effectively engage the rim due simply to the straight line force exerted on the pivotal points. I have, however, provided means for insuring a firm grip of the jaws independently of this straight line force if desired. For this purpose, the bars 34 and 35 are pivotally mounted with respect to the block 28 and the rack bar respectively. One end of each of these bars is provided with a tooth or prong 36 adapted to engage the web of the tire rim and the other end thereof is provided with a locking screw 37 adapted to engage the web of the rim. Upon tightening up the screw 37 the bar 34 or 35, as the case may be, it tilted against its pivotal end 36 so as to draw the jaws into firm engagement with the rim flanges.

It is desired that the bars 34 and 35, when used, should have a sufficient tilting movement to allow of the gripping action; but any rotary movement of these bars should be effectively resisted. I have, therefore, provided a specially formed tap screw stud 38 for holding each of the bars in place. The same includes a threaded shank 39 which threads into the block 28 or the rack bar, as the case may be, up to a shoulder 40. Beyond this shoulder is a squared neck 41 which works loosely within a slot 42 of the bar 34 or 35, as the case may be, and the head of the tap screw is large enough to hold the bar in place on the squared shank.

It will be noted that this implement is intended to be applied to the end portions of the rim on a relatively short chord. Consequently, when the rim is deflected no excessive strains are placed on the rim and it is not damaged or injured.

While I have herein shown and described only a sigle embodiment of the features of my present invention, still I do not intend to limit myself to the same, except as I may do so in the claim.

I claim:

A tire rim implement for the purpose specified comprising in combination a pair of longitudinally movable members, means for moving said members longitudinally with respect to each other, and means in conjunction with the free end of each of said members for engaging the tire rim comprising a pair of jaws together with a pivotal mounting between the inner ends thereof and the end portion of the corresponding movable member, the jaws of each pair curving from said pivotal mounting outwardly around the side flanges of the rim and having inturned hook ends adapted to engage the edge portions of the rim flanges, the jaws being bent downward at points intermediate between said pivotal mounting and their hook ends, whereby the hook ends of the jaws lie within a plane lying at an angle to the direction of the jaws at the position of the pivotal mounting aforesaid, substantially as described.

GEORGE B. HAINES.